United States Patent [19]

Zeiträeg

[11] 4,393,496
[45] Jul. 12, 1983

[54] METHOD FOR FEEDING CALL PROGRESS TONES INTO CONFERENCE CONNECTIONS

[75] Inventor: Rolf Zeiträeg, Munich, Fed. Rep. of Germany

[73] Assignee: Siemens Aktiengesellschaft, Berlin & Munich, Fed. Rep. of Germany

[21] Appl. No.: 228,676

[22] Filed: Jan. 26, 1981

[30] Foreign Application Priority Data

Feb. 12, 1980 [DE] Fed. Rep. of Germany ....... 3005162

[51] Int. Cl.³ .............................................. H04M 3/56
[52] U.S. Cl. .................................. 370/62; 179/18 BC
[58] Field of Search ................ 370/61, 62; 179/1 CN, 179/18 BC

[56] References Cited

U.S. PATENT DOCUMENTS 4,049,921 9/1977 Zwack ............................ 179/18 BC
4,109,111 8/1978 Cook .............................. 179/18 BC
4,190,742 2/1980 Southard .............................. 370/62

FOREIGN PATENT DOCUMENTS 2541295 3/1977 Fed. Rep. of Germany .
2812387 10/1979 Fed. Rep. of Germany ........ 370/62

Primary Examiner—Marc E. Bookbinder
Attorney, Agent, or Firm—Hill, Van Santen, Steadman, Chiara & Simpson

[57] ABSTRACT

In addition to the overall sum code words, call progress tone sum code words are formed which, in addition to the conference parts, respectively include a different PCM word corresponding to a call progress tone. In the formation of the respective partial sum code words to be transmitted, by subtraction from individual conference components, an overall sum code word or a call progress tone sum code word are selectively taken into consideration depending upon whether a call progress word is to be fed in or not or, respectively, depending upon what call progress tone is concerned.

1 Claim, 1 Drawing Figure

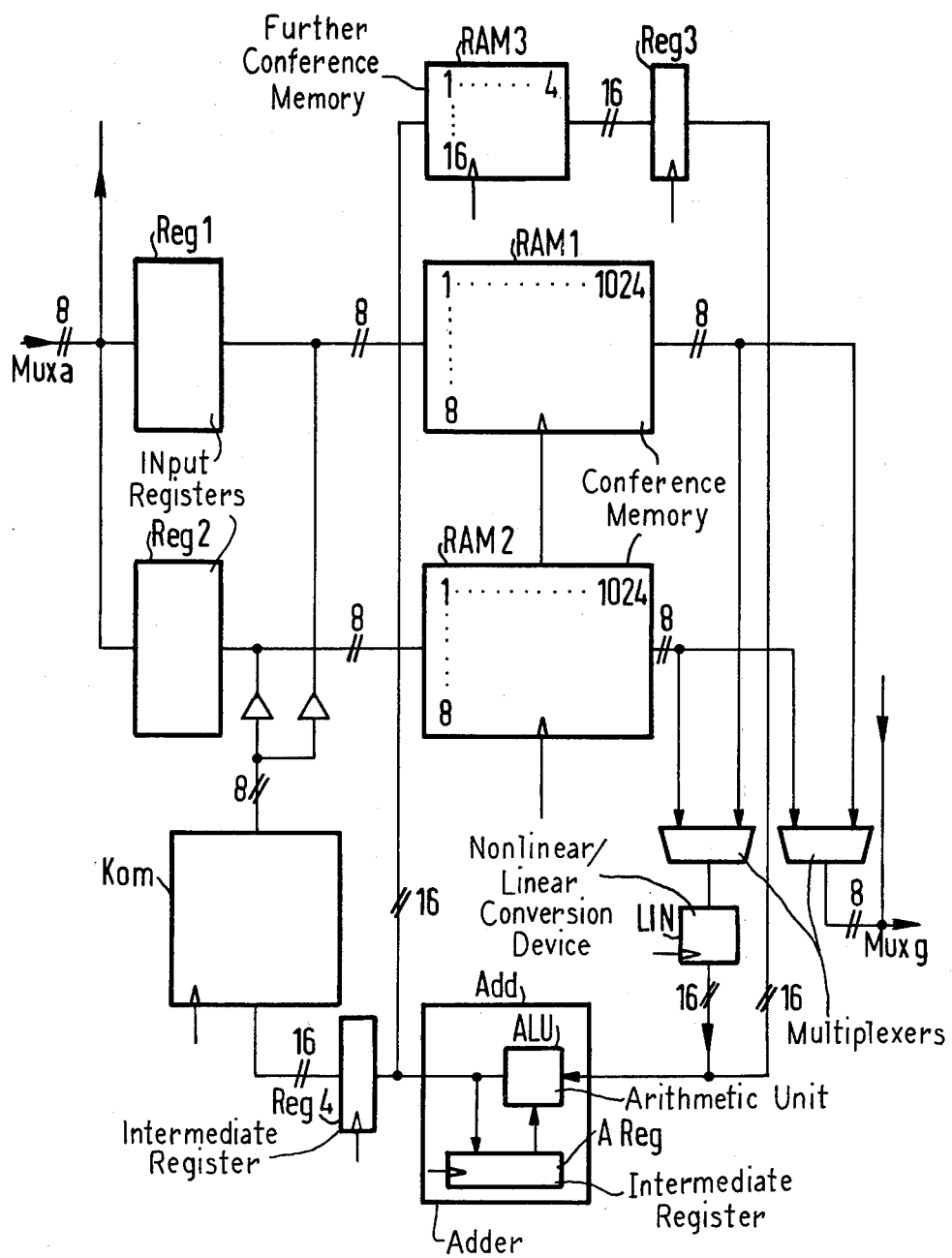

METHOD FOR FEEDING CALL PROGRESS TONES INTO CONFERENCE CONNECTIONS

BACKGROUND OF THE INVENTION

1. Field of the Invention

The invention relates to a method for feeding call progress tones into conference connections in a pulse code modulation (PCM) time-division multiplex switching system, in the course of which overall sum code words are formed from PCM words supplied by the conference participants and intermediately stored in one-half of a conference memory and, if need be, converted into a linear code presentation, from which overall sum code words a plurality of differential partial sum code words are respectively formed by subtraction of one of the PCM words, the partial sum code words, after intermediate storage in the half of the conference memory, being respectively forwarded—if need be after re-conversion into non-linear code presentations—to that conference participant whose overall sum component they do not contain, whereas new PCM words arriving from the conference participants are intermediately stored in the other half of the conference memory, whereby the two halves of the conference memory alternately interchange their roles.

2. Description of the Prior Art

It is known for PCM time-division multiplex switching systems to generate the call progress tones upon employment of specific PCM words which are periodically emitted upon consideration of specific tone/pause programs and then respectively produce a specific call progress tone after digital/analog conversion on the receiving side (cf., for example, German OS No. 2,541,295).

In conference connections, the feeding-in of such digitally-generated call progress tones corresponds to the connection of a further conference participant. Accordingly, such call progress tones were heretofore simultaneously transmitted to all participants of the conference connection. For specific call progress tones, namely, for example, for the offering tone or the "knocking" tone, however, it is also of interest that the tone is only sent to specific participants of the respective conference participants.

SUMMARY OF THE INVENTION

It is therefore the object of the present invention to provide a method for feeding call progress tones into conference connections which allows the call progress tone feed to be undertaken optionally in general, or subscriber-specific.

This object is achieved according to the invention given conference connections brought about in the manner mentioned above in that, in addition to the said overall sum code words, call progress tone sum code words are formed which, as sum components beyond the PCM words supplied by the conference subscribers, respectively comprise a PCM word corresponding to a specific call progress tone; and in that overall sum code words and call progress tone code words which belong together are intermediately stored in a further intermediate memory, proceeding from which, respectively, a specific one of the same is subjected to the partial sum formation on the basis of call progress tone transmission criteria.

The inventive method can be executed with a conference set which is altered only in an insignificant manner in comparison to known conference sets in terms of format and manner of operation.

BRIEF DESCRIPTION OF THE DRAWING

Other objects, features and advantages of the invention, its organization and operation, will be best understood from the following detailed description, taken in conjunction with the accompanying drawing, on which there is a single FIGURE of a block circuit diagram of a conference set suitable for practicing the invention.

DESCRIPTION OF THE PREFERRED EMBODIMENT

It is assumed in the present exemplary embodiment that the conference set illustrated in the FIGURE is assigned to the switching matrix group of a PCM switching center at which 32 PCM lines are connected. The PCM words transmitted via said PCM lines, after serial/parallel conversion and channel-wise interleaving, arrive on a time-division multiplex line comprising eight line branches for the parallel transmission of the eight bits of the PCM words, a bit transmission rate of eight Mbit/sec prevailing on said time-division multiplex line. The incoming part Muxa of said time-division multiplex line is illustrated at the left in the FIGURE and the outgoing part Muxg is illustrated at the right. PCM words occurring on the time-division multiplex line which belong to normal dual connections are switched via a time switching stage (not illustrated here) of the switching locations. On the other hand, the PCM words belonging to conference connections are coupled out to the illustrated conference set and, via an input register Reg1 or Reg2, arrive at the one or other half RAM1 or RAM2 of a conference memory. Here, the conference memory halves are respectively subdivided into 64 memory areas which are allocated to 64 simultaneously possible conference connections and respectively exhibit memory locations for eight conference participants. Moreover, the conference memory halves respectively exhibit memory space for the three PCM words (in the present case) which serve for generating three different call progress tones.

The conference memory parts RAM1 and RAM2 are randomly driven both upon inscription as well as upon readout and alternately change their roles, as shall be explained below, for example, upon acceptance of PCM words from the incoming multiplex line Muxa.

During a pulse frame in which, for example, the conference memory half RAM1 serves for information acceptance, the incoming PCM words on the time-division multiplex line Muxa which represent the parts of the individual conference participants arrive into the assigned memory locations of the memory areas of the memory half RAM1. Moreover, PCM words which have been generated at a central location by a call progress tone generator and which are incoming on the time-division multiplex line Muxa and serve for the representation of the call progress tones are inscribed in the memory locations of the conference memory half RAM1 provided for this purpose.

In the following pulse frame, this conference memory half undertakes the processing of the PCM words intercalated in such manner, to contrast to which the PCM words which are now incoming are inscribed in the second half RAM2 of the conference memory in accord with the manner described above.

In the train of the processing, the PCM words representing conference parts are first successively read from the memory half RAM1 and, insofar as they exhibit a non-linear code representation, are subjected to a code conversion into linear code representations by a device LIN in order to arrive at an adder Add in this form. In the adder, the PCM words from the individual conference participants of a conference connection are successively summed by an actual arithmetic unit ALU, whereby the intermediate sums arising are respectively intermediately stored in an intermediate register AReg and are then resupplied to the arithmetic unit ALU.

The overall sum code word GS arising in such manner is inscribed in an intermediate register Reg 4 and in a further conference memory RAM3 of the conference set, whereby the transfer, however, ensues in such manner that said code word also remains in the register AReg of the adder Add.

Now, the PCM words serving for the representation of the call progress tones are successively read from the memory half RAM1, and if need be are linearized, and are added to the overall sum code words GS in order to form respectively separate call progress tone sum code words. After they have arisen, the individual call progress tone sum code words are likewise inscribed in an individually allocated memory location of the further conference memory RAM3 which, given n call progress tones provided, accordingly exhibits n+1 memory locations, i.e., four memory locations here. In said conference memory, thus, in addition to the overall sum code word GS formed solely from the conference parts of a conference connection, there are now located three call progress tone sum code words HS1 through HS3 which are formed from the overall sum code word and the respective call progress tone word as sum components.

In the train of the next processing step, which likewise lies in the second pulse frame under consideration, one PCM word from the appertaining conference subscriber is successively subtracted from one of the overall code words stored in the conference memory RAM3. The decision as to whether the subtraction occurs from the overall sum code word GS or from one of the call progress tone sum code words HS1 through HS3 depends on whether a call progress tone is to be mixed in at this point in time at all and, should this be the case, which of the call progress tones available is to be transmitted to the appertaining conference participant to whom the time slot now treated belongs.

The said subtraction is likewise undertaken with the assistance of the adder Add.

The subtraction results, if need be after a conversion into non-linear code representation, are again inscribed with the assistance of write-in control device KOM into those memory cells of the conference memory part RAM1 which are assigned to the individual conference participants. During the time slots assigned to the individual conference participants, there now occurs from there an output from the conference memory part or, respectively, an insertion onto the outgoing part Muxg of the time-division multiplex line. Therefore, respective partial sums are supplied to the individual conference participants, the partial sums being composed either only of the conference parts of the respective other conference participants or of the conference parts and a PCM word serving to generate a specific call progress tone.

PCM words which arive at the conference set in the pulse frame in which the outputs to the outgoing line part of the time-division multiplex line occur, are again inscribed in the conference memory half RAM1 after a change of the operating mode of the conference memory halves which has occurred in the meantime. The processing of such PCM words in the form of a sum formation and subsequent difference formation explained above now occurs proceeding from the other conference memory half RAM2.

Although I have described my invention by reference to a particular embodiment, many changes and modifications may become apparent to those skilled in the art without departing from the spirit and scope of the invention. I therefore intend that the patent warranted hereon cover all such changes and modifications as may reasonably and properly be included within the scope of my contribution to the art.

I claim:

1. In a method for feeding call progress tones into conference connections in a pulse code modulation (PCM) time-division multiplex switching system, in which PCM code words are repetitively supplied by conference subscribers, sum code words are formed from the PCM code words and said PCM code words are intermediately stored in one half of a first conference memory, in which a plurality of different partial sum code words are formed by subtracting from a sum code word a respective different one of the supplied PCM code words, said partial sum code words being intermediately stored in a second conference memory before transmission of those partial sum code words to each subscriber, such partial sum code word containing only the code words supplied by the other conference subscribers, and in which the above steps are performed for subsequently-arriving PCM words with respect to a second half of the first conference memory and the conference memory halves alternately so perform the above steps at each new receipt of PCM code words, the improvement comprising the steps of:

in addition to forming the sum code words, forming call progress tone sum code words, by adding code words stored in the memory halves to respective call progress tone code words;

intermediately storing the sum code words and respective call progress tone sum code words; and selectively forming partial sum code words by subtracting a PCM code word pertaining to a particular subscriber from either the intermediately stored sum code words or the respective call progress tone sum code words on the basis of call progress criteria.

* * * * *